United States Patent
Stojkovic et al.

(10) Patent No.: US 7,036,874 B2
(45) Date of Patent: May 2, 2006

(54) FRONT-END TO BODY-SIDE JOINT FOR AN AUTOMOTIVE VEHICLE

(75) Inventors: Dragan Stojkovic, Southgate, MI (US);
Larry Dupuis, Grosse Ile, MI (US);
James Lowe, Temperance, MI (US);
Stephen Bruford, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/711,523

(22) Filed: Sep. 23, 2004

(65) Prior Publication Data

US 2006/0061137 A1    Mar. 23, 2006

(51) Int. Cl.
*B60J 5/04*   (2006.01)

(52) U.S. Cl. ............ 296/193.09; 296/198; 296/203.02; 296/30; 296/146.11; 296/202

(58) Field of Classification Search ........... 296/187.09, 296/193.09, 193.11, 198, 205, 203.02, 30, 296/146.11, 202
See application file for complete search history.

(56) References Cited

U.S. PATENT DOCUMENTS

| | | | |
|---|---|---|---|
| 5,031,958 A | 7/1991 | Fujita et al. | |
| 5,586,799 A | 12/1996 | Kanemitsu et al. | |
| 6,086,143 A | 7/2000 | Schroeder et al. | |
| 6,129,410 A | 10/2000 | Kosaraju et al. | |
| 6,139,093 A | 10/2000 | Elliott et al. | |
| 6,192,584 B1 | 2/2001 | Gundlach et al. | |
| 6,364,401 B1 | 4/2002 | Kim | |
| 6,561,563 B1 | 5/2003 | Okana et al. | |
| 6,679,547 B1 | 1/2004 | Ju-Sik | |
| 2005/0269838 A1* | 12/2005 | Sohmshetty et al. ... | 296/203.02 |

* cited by examiner

*Primary Examiner*—Jason Morrow
(74) *Attorney, Agent, or Firm*—Gigette M. Bejin; Artz & Artz, P.C.

(57) ABSTRACT

One embodiment of the present invention is an improved front-end to body-side joint (10) for an automotive vehicle. This joint (10) includes an integral front end structure (12) having a fender attachment portion (16) and one or more hinge-reinforcement portions (14). The fender attachment portion (16) is coupled to a fender (24). Moreover, the hinge-reinforcement portions (14) are attached to a pillar member (28) of a vehicle body (46) for supporting a door (20). The integral front end structure (12) is a master-locating component for positioning the fender (24) and the door (20) in a predetermined configuration within the joint (10).

20 Claims, 3 Drawing Sheets

FRONT-END TO BODY-SIDE JOINT FOR AN AUTOMOTIVE VEHICLE

TECHNICAL FIELD

The present invention relates generally to vehicle body construction, and more particularly to an improved front-end to body-side joint for improving reliability of manufacture and decreasing manufacturing cycle time and costs associated therewith.

BACKGROUND

It is well known in vehicle body construction to provide a front end and a body, which are mounted to a vehicle frame. The body typically includes a longitudinally-extending member, or shotgun, for attachment to an exterior side of an A-pillar section of the body. Typically, this front-end to body-side joint further includes one or more reinforcement plates coupled to an interior side of the A-pillar section. These reinforcement plates are utilized for reinforcing the A-pillar section and supporting one or more door hinges disposed at or adjacent to the joint.

It would be desirable to provide a front-end to body-side joint for enhancing reliability of manufacture, increasing the rigidity of the vehicle body, reducing the number of components, minimizing manufacturing cycle time, and decreasing costs associated therewith.

SUMMARY OF THE INVENTION

One embodiment of the present invention is an improved front-end to body-side joint for an automotive vehicle. This joint includes an integral front end structure which is made up of a fender attachment portion and one or more hinge-reinforcement portions. The fender attachment portion is coupled to a fender. Moreover, the hinge-reinforcement portions are attached to a pillar member of a vehicle body for supporting a door. The integral front end structure is a master-locating component for positioning the fender and the door in a predetermined configuration within the joint.

One advantage of the present invention is that an improved front-end to body-side joint is provided that enhances alignment of vehicle body components and decreases manufacturing cycle time, as well as costs associated therewith.

Another advantage of the present invention is that an improved front-end to body-side joint is provided that includes substantially few components so as to further decrease manufacturing cycle time and costs associated therewith.

Yet another advantage of the present invention is that an improved front-end to body-side joint is provided that increases reliability and precision of manufacture.

Still another advantage of the present invention is that an improved front-end to body-side joint is provided that has a front end structure with a continuous load path to the vehicle body.

Yet another advantage of the present invention is that an improved front-end to body-side joint is provided that has a substantially rigid construction for improving vehicle body construction.

Still another advantage of the present invention is that an improved front-end to body-side joint is provided that yields consistent body panel fits for minimizing wind noise and water leakage.

Other advantages of the present invention will become apparent upon considering the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of the examples of the invention.

DETAILED DESCRIPTION OF THE INVENTION

Figure 1:
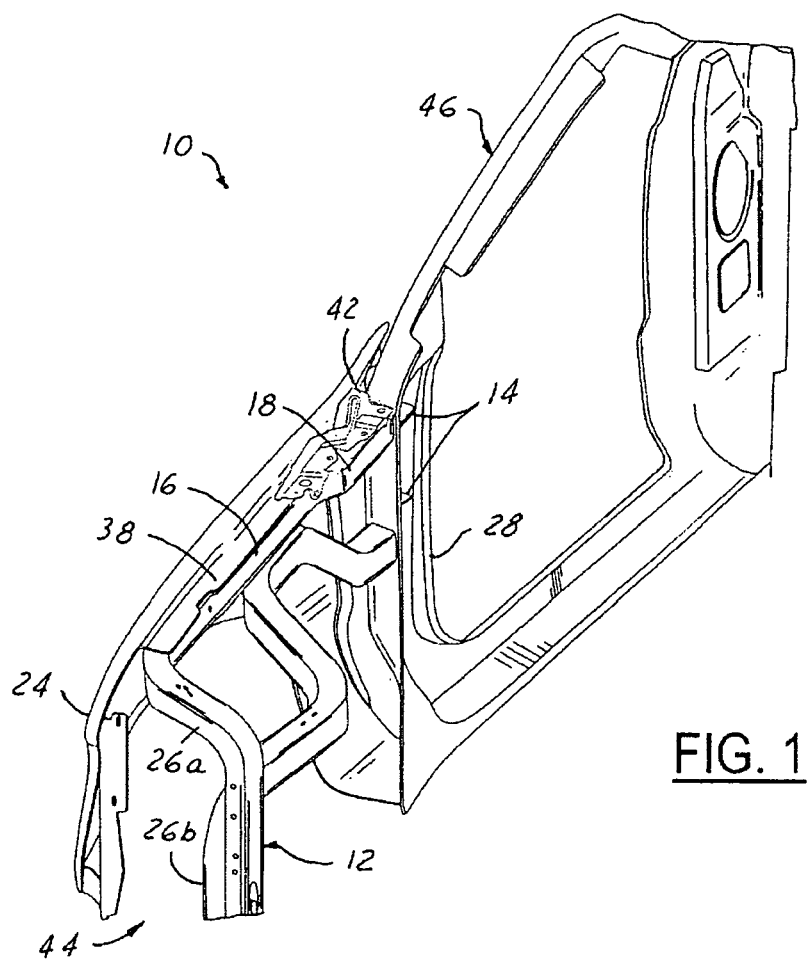
FIG. 1 is a perspective view of an improved front-end to body-side joint for an automotive vehicle, according to one advantageous embodiment of the claimed invention.

In the following figures, the same reference numerals are used to identify the same components in the various views.

The present invention is particularly suited for a front end of a vehicle body construction. In this way, the embodiments described herein employ structural features where the context permits. However, various other embodiments are contemplated having different combinations of the described features, having features other than those described herein, or lacking one or more of those features. For example, it is understood that the invention can be utilized for a rear end of a vehicle body construction as desired. For that reason, it is contemplated that the invention can be carried out in a variety of other modes and utilized for other suitable applications as desired.

Figure 4:
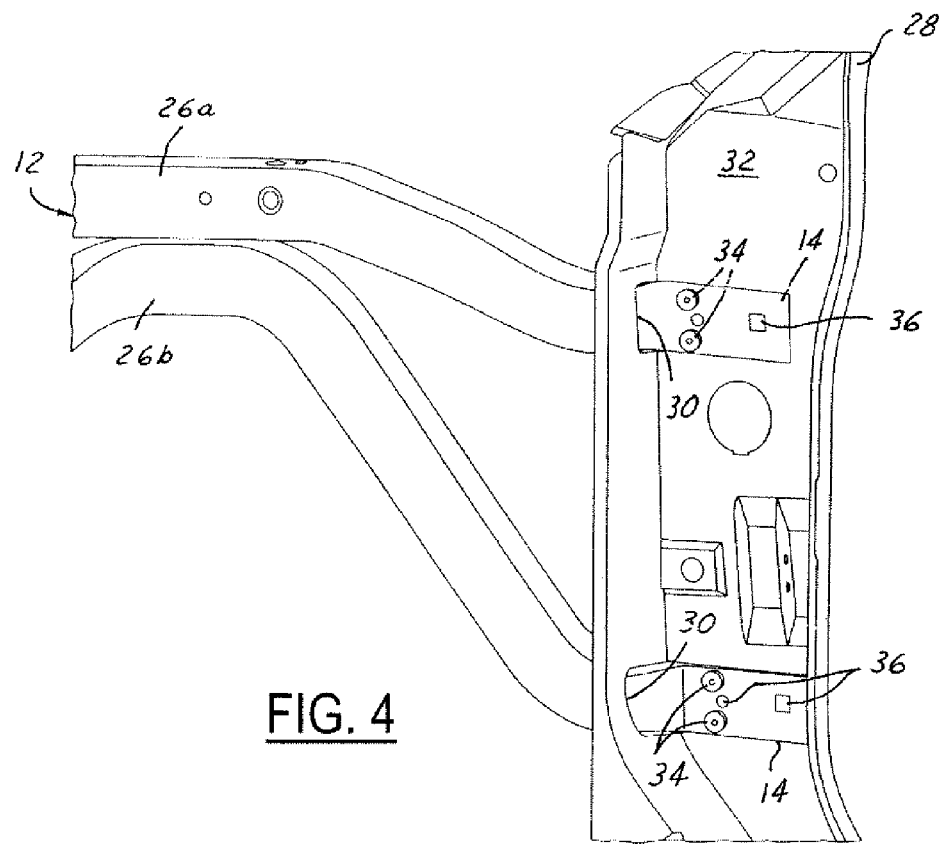
FIG. 4 is a perspective view of the integral front end structure shown in FIG. 3, illustrating the integral front end structure having a pair of hinge-reinforcement portions for attachment to a pillar member of a vehicle body.
Figure 5:
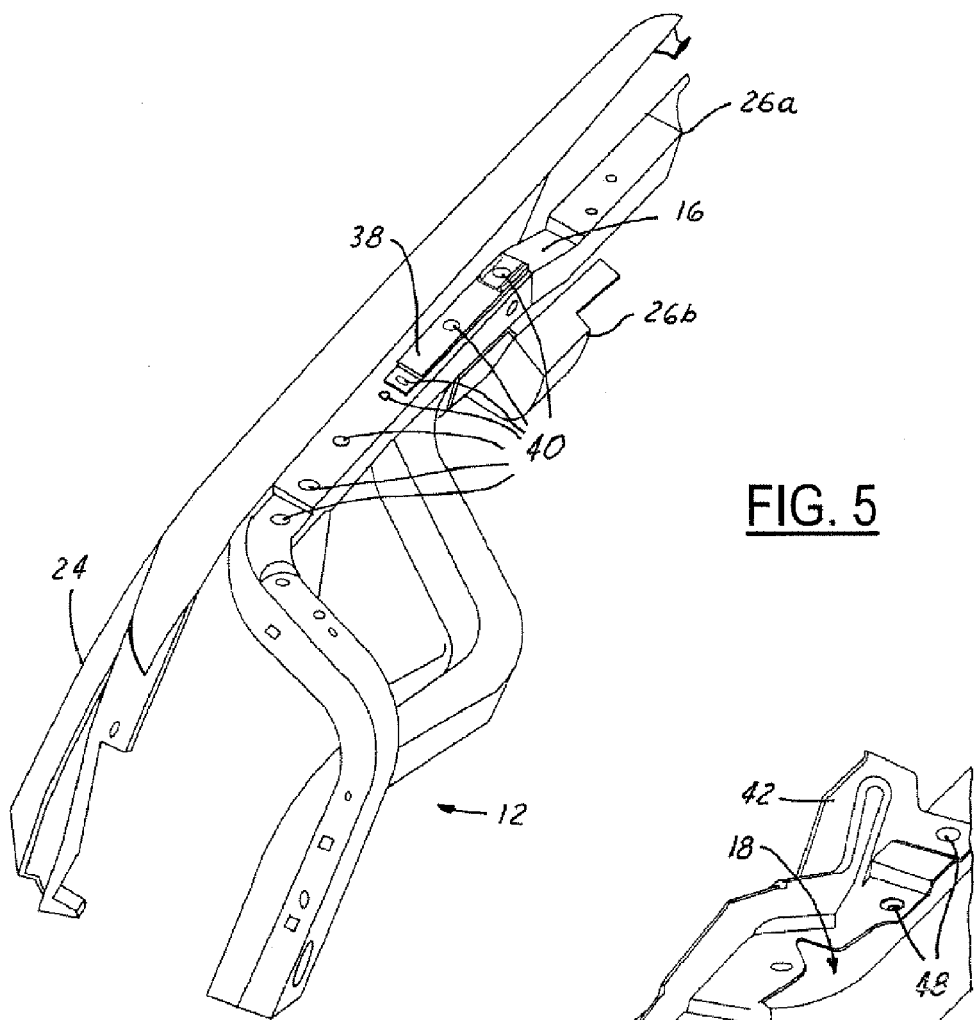
FIG. 5 is a perspective view of the integral front end structure shown in FIG. 3, illustrating the integral front end structure having a fender attachment portion for attaching a fender thereto.
Figure 6:
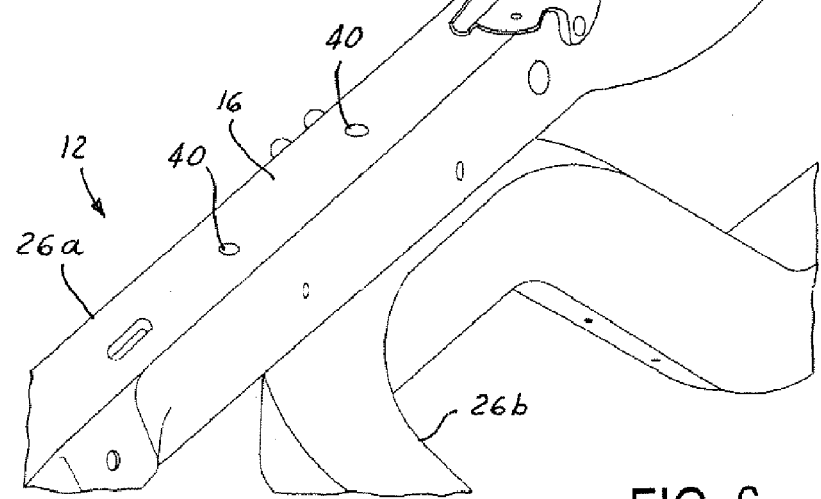
FIG. 6 is an enlarged view of the improved front-end to body-side joint shown in FIG. 3, as taken within circle 3, illustrating the integral front end structure having a hood-hinge attachment portion for mounting a hood hinge thereon.

Referring to FIG. 1, there is shown a perspective view of an improved front-end to body-side joint 10 ("improved joint") for an automotive vehicle, according to one advantageous embodiment of the claimed invention. The improved joint 10 includes an integral front end structure 12 having one or more hinge reinforcement portions 14 (as best shown in FIG. 4), a fender attachment portion 16 (as best shown in FIG. 5), and a hood-hinge attachment portion 18 (as best shown in FIG. 6).

Figure 2:
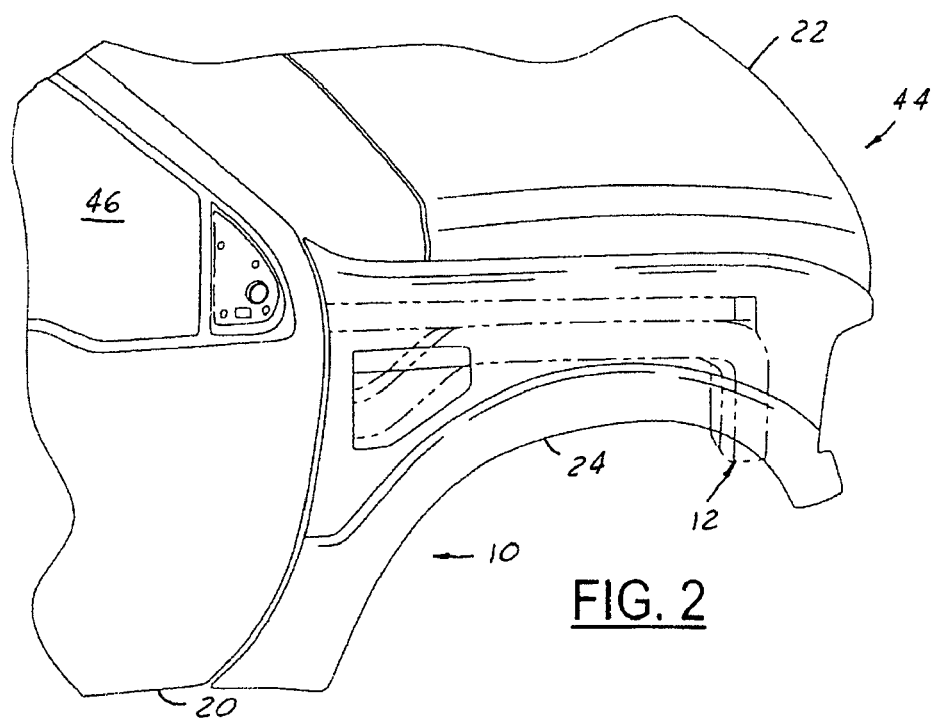
FIG. 2 is another perspective view of the improved front-end to body-side joint, shown in FIG. 1, illustrating a substantially high quality fit and finish of a door, a fender, and a hood.

In this way, as shown in FIG. 2, the integral front end structure 12 is a single master-locating component for positioning a door 20, a hood 22, and a fender 24 in a predetermined configuration. However, it is contemplated that the integral front end structure can be utilized for positioning various other suitable components.

This self-locating feature is beneficial for precisely locating various body panels, minimizing gaps between panels, and consistently providing a high quality fit and finish over a mass production of vehicles. In this regard, the self-locating feature eliminates the need for aligning the door 20, the hood 22, and the fenders 24 to two or more separate references. For that reason, the improved joint 10 substantially decreases manufacturing cycle time and costs associated therewith. Also, the enhanced fit and finish of the construction can minimize wind noise and prevent water leakage.

Figure 3:
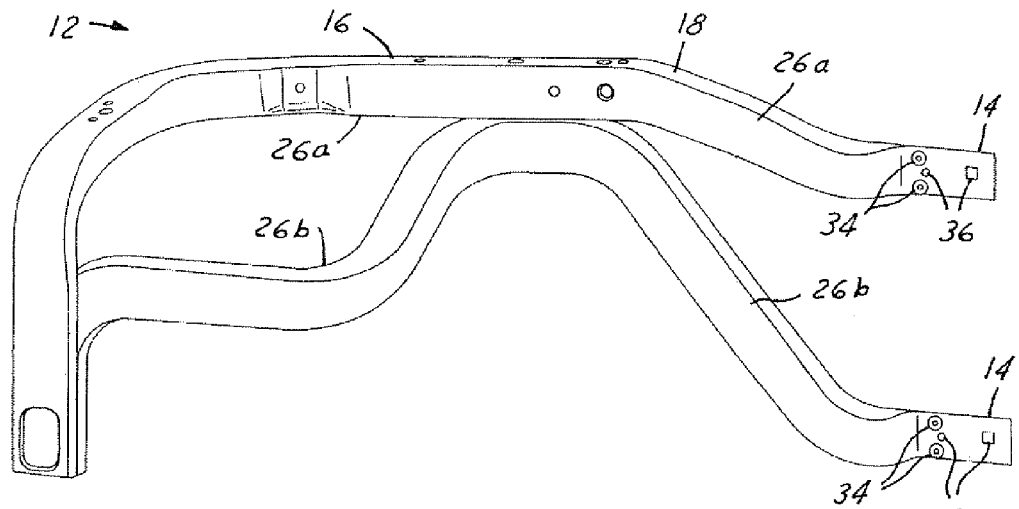
FIG. 3 is a perspective view of the integral front end structure of the improved front-end to body-side joint shown in FIG. 1.

Referring now to FIG. 3, the integral front end structure 12 is comprised of two hydroformed tubes 26a, 26b, which are coupled to each other via automatic laser welding, continuous fusion welding, or various other suitable attachment processes. However, it is contemplated that more or less than two hydroformed tubes can be utilized as desired. One skilled in the art will understand that the hydroformed tubes 26a, 26b provide a construction with a substantially high strength-to-weight ratio.

Referring now to FIG. 4, each hydroformed tube 26a, 26b has a flattened end portion, which comprise the hinge reinforcement portions 14 for attachment to a pillar member 28 of the vehicle body 46. Specifically, the hinge reinforcement portions 14 are flattened or otherwise crimped end portions of each hydroformed tube 26a, 26b. These hinge reinforcement portions 14 are inserted through openings 30 formed within the pillar member 28 and are welded or otherwise coupled to an interior surface 32 of the pillar member 28. This feature is beneficial for eliminating the need for utilizing separate hinge reinforcement plates. In this respect, the integral front end structure 12 can decrease the number of parts for a front-end to body-side joint and minimize costly sub-assembly procedures. In addition, as introduced above, this construction can decrease the number of references by which components must be aligned. In this regard, the integral front end structure 12 enhances the precision and reliability of manufacture.

In this embodiment, the hinge reinforcement portions 14 are spaced apart at a predetermined distance for minimizing door sag. Also, in this embodiment, each hinge reinforcement portion 14 has one or more extrusions (not shown), weld nuts 34, and holes 36 for attaching to the pillar member 28.

Referring now to FIG. 5, the integral front end structure 12 further includes the fender attachment portion 16 for coupling to the fender 24. In this embodiment, the fender attachment portion 16 is a top side of the hydroformed tube 26a. This top side is utilized for attaching to a flange 38 that extends from the fender 24. The flange 38 of the fender 24 and the top side of the hydroformed tube 26a have a series of apertures 40 formed therein for receiving various suitable fasteners and fixedly attaching the fender to the integral front end structure 12. The apertures 40 are positioned for locating the fender 24 in a predetermined position within the improved joint 10. This self-locating feature increases the fit and finish of the joint, minimizes manufacturing cycle time, and decreases costs associated therewith.

It is understood that the fender attachment portion 16 can be various other portions of the integral front end structure 12. It will also be appreciated that the fender 24 can be welded or otherwise attached to the integral front-end structure by various suitable attachment methods. In addition, it is also contemplated that the flange can also include weld nuts, extrusions, various other fastening mechanisms, or any combination thereof as desired.

Referring now to FIG. 6, the integral front end structure 12 further includes the hood-hinge attachment portion 18 for positioning the hood 22 in the predetermined configuration. In this embodiment, the hood-hinge attachment portion 18 is a predetermined section of the top side of the hydroformed tube 26a. This section includes one or more holes 48 for receiving fasteners and mounting a hood hinge 42 to the hydroformed tube 26a in the predetermined location. In this way, the integral front end structure 12 positions the hood 22 in a predetermined configuration within the improved joint and dispenses with the need to align the hood hinge 42.

It will be appreciated that the hood-hinge attachment portion 18 can be various other suitable portions of the integral front end structure 12. Also, it is understood that the hood hinge 42 can be welded or otherwise attached to the integral front-end structure 12 by various suitable attachment methods. In addition, the hood hinge 42 can include weld nuts, extrusions, various other fastening mechanisms, or any combination thereof as desired.

As best shown in FIG. 1, the integral front end structure 12 extends substantially from a front end 44 of the vehicle to the vehicle body 46. This construction is beneficial for providing a continuous path load to the vehicle body 46 and stiffening the entire vehicle construction.

While particular embodiments of the invention have been shown and described, it will be understood, of course, that the invention is not limited thereto since modifications may be made by those skilled in the art, particularly in light of the foregoing teachings. Accordingly, it is intended that the invention be limited only in terms of the appended claims.

What is claimed is:

1. An improved front-end to body-side joint for an automotive vehicle, comprising:
   an integral front end structure having a fender attachment portion and at least one hinge-reinforcement portion;
   a fender coupled to said fender attachment portion of said integral front end structure; and
   a pillar member of a vehicle body coupled to said at least one hinge-reinforcement portion for mounting a door thereon;
   wherein said integral front end structure is a master-locating component for positioning said fender and said door in a predetermined configuration.

2. The improved front-end to body-side joint as recited in claim 1 wherein said integral front end structure comprises at least one hydroformed tube.

3. The improved front-end to body-side joint as recited in claim 2 wherein said at least one hydroformed tube has a flattened end portion, said flattened end portion being said at least one hinge-reinforcement portion for attachment to said pillar member.

4. The improved front-end to body-side joint as recited in claim 2 wherein said at least one hydroformed tube includes a first hydroformed tube and a second hydroformed tube coupled to said first hydroformed tube, said first hydroformed tube and said second hydroformed tube respectively having a first flattened end portion and a second flattened end portion for attachment to said pillar member, said first flattened end portion and said second flattened end portion being spaced apart a predetermined distance.

5. The improved front-end to body-side joint as recited in claim 1 wherein said at least one hinge-reinforcement portion is coupled to an interior side of said pillar member.

6. The improved front-end to body-side joint as recited in claim 1 wherein said pillar member has at least one opening with said integral front end structure disposed therein.

7. The improved front-end to body-side joint as recited in claim 1 wherein said at least one hinge-reinforcement portion includes at least one of a hole, a weld nut, and an extrusion for attaching said pillar member to said at least one hinge-reinforcement portion.

8. The improved front-end to body-side joint as recited in claim 1 wherein said fender attachment portion includes at least one of a hole, a weld nut, and an extrusion for attaching said fender to said fender attachment portion.

9. An improved front-end to body-side joint for an automotive vehicle, comprising:
    an integral front end structure having a fender attachment portion, a hood-hinge attachment portion, and at least one hinge-reinforcement portion;
    a fender coupled to said fender attachment portion of said integral front end structure;
    a hood hinge coupled to said hood-hinge attachment portion of said integral front end structure for attaching a hood thereto; and
    a pillar member of a vehicle body coupled to said at least one hinge-reinforcement portion for attaching a door thereto;
    wherein said integral front end structure is a master-locating component for positioning said fender, said hood, and said door in a predetermined configuration.

10. The improved front-end to body-side joint as recited in claim 9 wherein said integral front end structure comprises at least one hydroformed tube.

11. The improved front-end to body-side joint as recited in claim 10 wherein said at least on hydroformed tube has a flattened end portion, said flattened end portion being said at least one hinge-reinforcement portion for attachment to said pillar member.

12. The improved front-end to body-side joint as recited in claim 10 wherein said at least one hydroformed tube includes a first hydroformed tube and a second hydroformed tube coupled to said first hydroformed tube, said first hydroformed tube and said second hydroformed tube respectively having a first flattened end portion and a second flattened end portion for attachment to said pillar member, said first flattened end portion and said second flattened end portion being spaced apart a predetermined distance.

13. The improved front-end to body-side joint as recited in claim 9 wherein said at least one hinge-reinforcement portion is coupled to an interior side of said pillar member.

14. The improved front-end to body-side joint as recited in claim 9 wherein said pillar member has at least one opening with said integral front end structure disposed therein.

15. The improved front-end to body-side joint as recited in claim 9 wherein said at least one hinge-reinforcement portion includes at least one of a hole, a weld nut, and an extrusion for attaching said pillar member to said at least one hinge-reinforcement portion.

16. The improved front-end to body-side joint as recited in claim 9 wherein said fender attachment portion includes at least one of a hole, a weld nut, and an extrusion for attaching said fender to said fender attachment portion.

17. The improved front-end to body-side joint as recited in claim 9 wherein said hood-hinge attachment portion includes at least one of a hole, a weld nut, and an extrusion for attaching said hood hinge to said hood-hinge attachment portion.

18. An improved front-end to body-side joint for an automotive vehicle, comprising:
    an integral front end structure having a fender attachment portion, a hood-hinge attachment portion, and at least one hinge-reinforcement portion;
    a fender coupled to said fender attachment portion of said integral front end structure;
    a hood hinge coupled to said hood-hinge attachment portion of said integral front end structure for attaching a hood thereto; and
    a pillar member of a vehicle body coupled to said at least one hinge-reinforcement portion for attaching a door thereto;
    wherein said integral front end structure is a master-locating component for positioning said fender, said hood, and said door in a predetermined configuration;
    wherein said integral front end structure has a construction for providing a continuous load path to said vehicle body.

19. The improved front-end to body-side joint as recited in claim 18 wherein said integral front end structure extends substantially from said vehicle body to a front end of the automotive vehicle.

20. The improved front-end to body-side joint as recited in claim 18 wherein said integral front end structure comprises at least one hydroformed tube.

* * * * *